(12) United States Patent
Ota et al.

(10) Patent No.: US 6,185,050 B1
(45) Date of Patent: Feb. 6, 2001

(54) ZOOM LENS HAVING TWO LENS GROUPS

(75) Inventors: Kohei Ota; Minoru Yokota, both of Hachioji (JP)

(73) Assignee: Konica Corporation, Tokyo (JP)

(*) Notice: Under 35 U.S.C. 154(b), the term of this patent shall be extended for 0 days.

(21) Appl. No.: 09/276,813

(22) Filed: Mar. 26, 1999

(30) Foreign Application Priority Data

Mar. 27, 1998 (JP) .................................................. 10-081301

(51) Int. Cl.⁷ .................................................. G02B 15/14
(52) U.S. Cl. .......................... 359/691; 359/692; 359/687; 359/690
(58) Field of Search .................................... 359/692, 691, 359/686, 687, 689, 690

(56) References Cited

U.S. PATENT DOCUMENTS 5,986,821 * 11/1999 Yoon ..................................... 359/692
6,008,953 * 12/1999 Itoh ...................................... 359/692

* cited by examiner

*Primary Examiner*—Georgia Epps
*Assistant Examiner*—Tim Thompson
(74) *Attorney, Agent, or Firm*—Finnegan, Henderson, Farabow, Garrett & Dunner, L.L.P.

(57) ABSTRACT

A zoom lens includes: a first lens group having positive refracting power; and a second lens group provided on an image side of the first lens group, having negative refracting power. The zoom lens has a variable power ratio of not less than 2.5 and a field angle of not less than 70° at a wide angle end, and a magnification of the zoom lens is changed by changing a distance between the first lens group and the second lens group, and further the following conditions are satisfied, $$1.25 \leq Tw/Tt \leq 1.8$$

$$0.6 \leq fFc/fw \leq 0.9$$

where Tw represents a telephoto ratio at a wide angle end of the zoom lens, Tt represents a telephoto ratio at a telephoto end of the zoom lens, fw represents a focal length of the zoom lens at the wide angle end, and fFc represents a focal length of the first lens group.

12 Claims, 12 Drawing Sheets

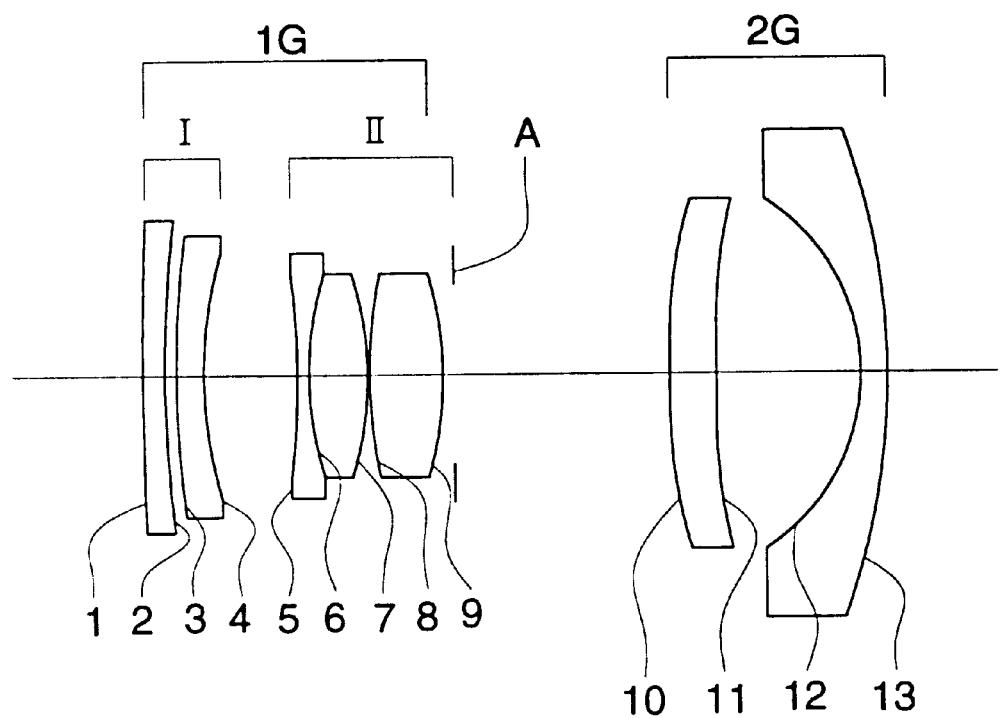

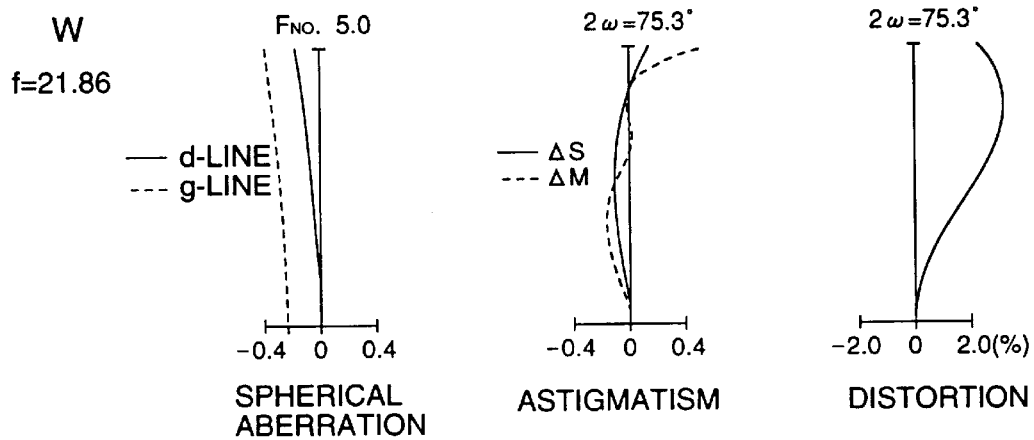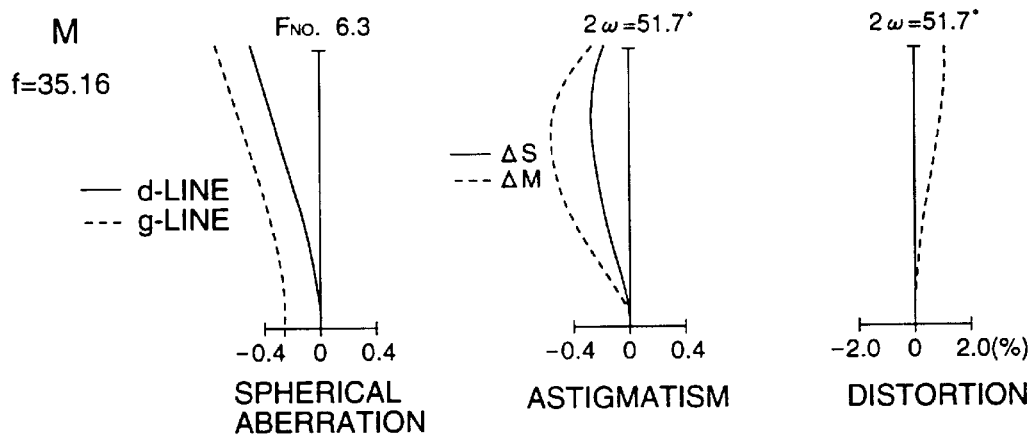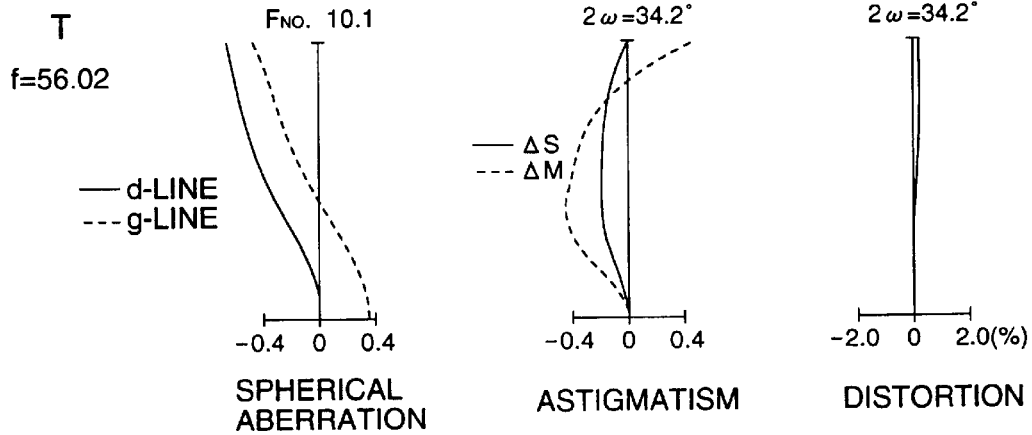

FIG. 4(A)-1    FIG. 4(A)-2    FIG. 4(A)-3
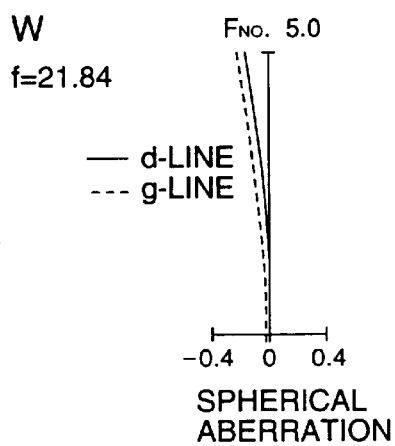
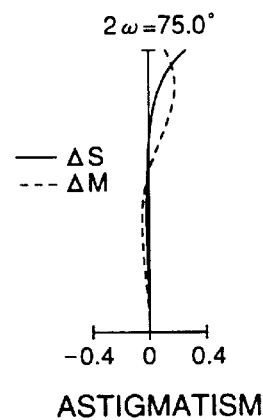
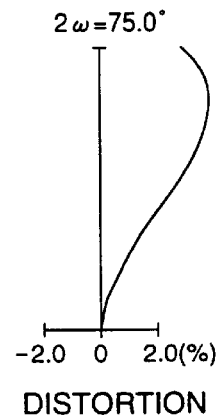
FIG. 4(B)-1    FIG. 4(B)-2    FIG. 4(B)-3
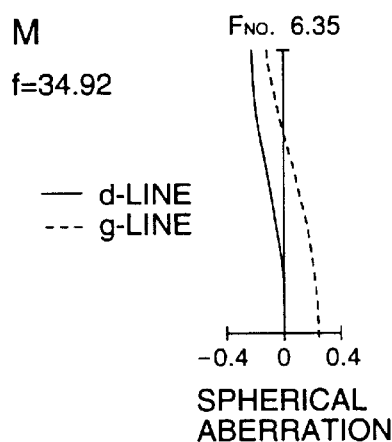
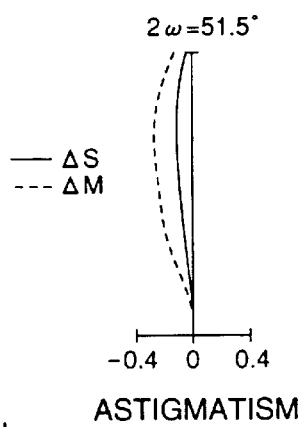
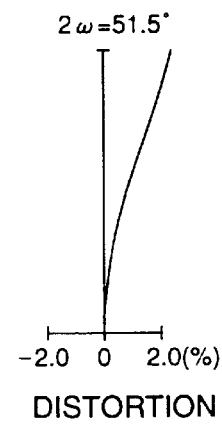
FIG. 4(C)-1    FIG. 4(C)-2    FIG. 4(C)-3
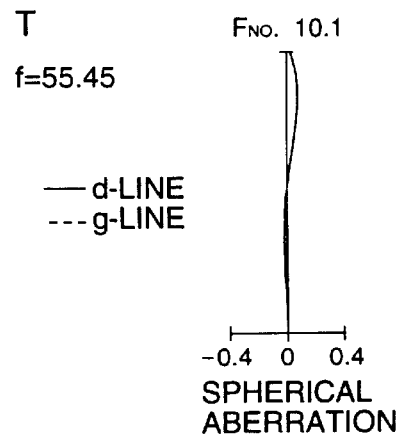
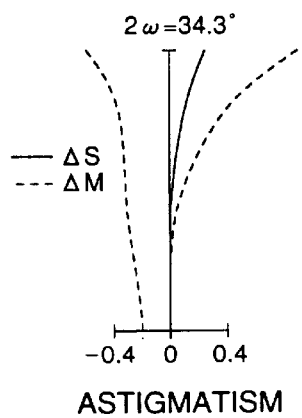
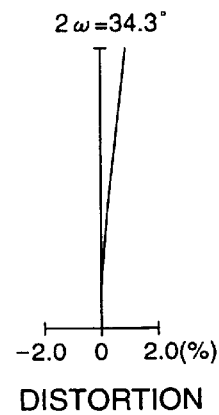

W
f=22.76
F$_{NO.}$ 3.9
— d-LINE
--- g-LINE
-0.4  0  0.4
SPHERICAL ABERRATION

2ω=73.9°
— ΔS
--- ΔM
-0.4  0  0.4
ASTIGMATISM

2ω=73.9°
-2.0  0  2.0(%)
DISTORTION

M
f=35.24
F$_{NO.}$ 6.1
— d-LINE
--- g-LINE
-0.4  0  0.4
SPHERICAL ABERRATION

2ω=51.8°
— ΔS
--- ΔM
-0.4  0  0.4
ASTIGMATISM

2ω=51.8°
-2.0  0  2.0(%)
DISTORTION

T
f=58.47
F$_{NO.}$ 10.1
— d-LINE
--- g-LINE
-0.4  0  0.4
SPHERICAL ABERRATION

2ω=33.0°
— ΔS
--- ΔM
-0.4  0  0.4
ASTIGMATISM

2ω=33.0°
-2.0  0  2.0(%)
DISTORTION

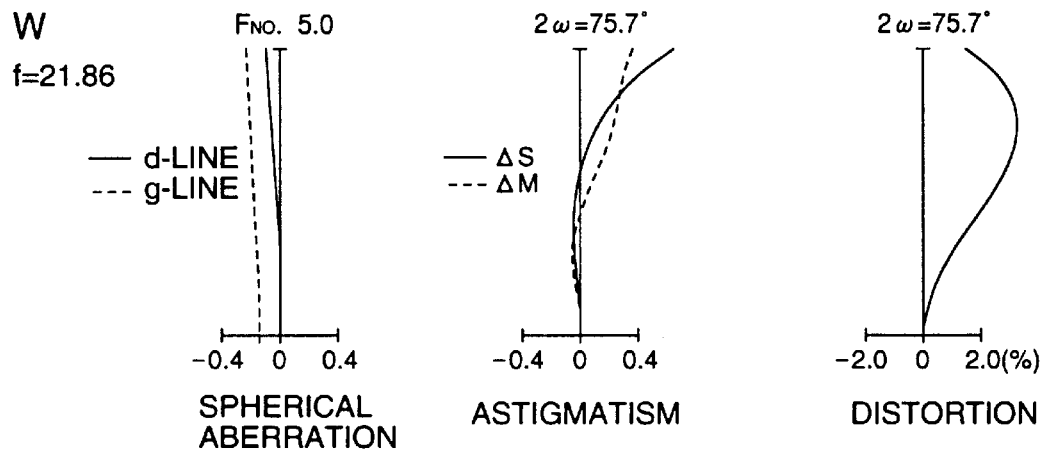
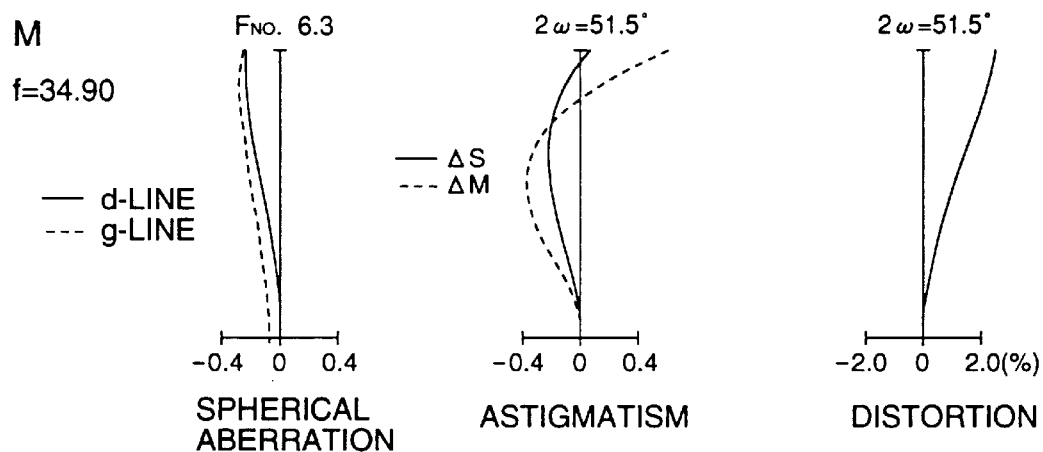
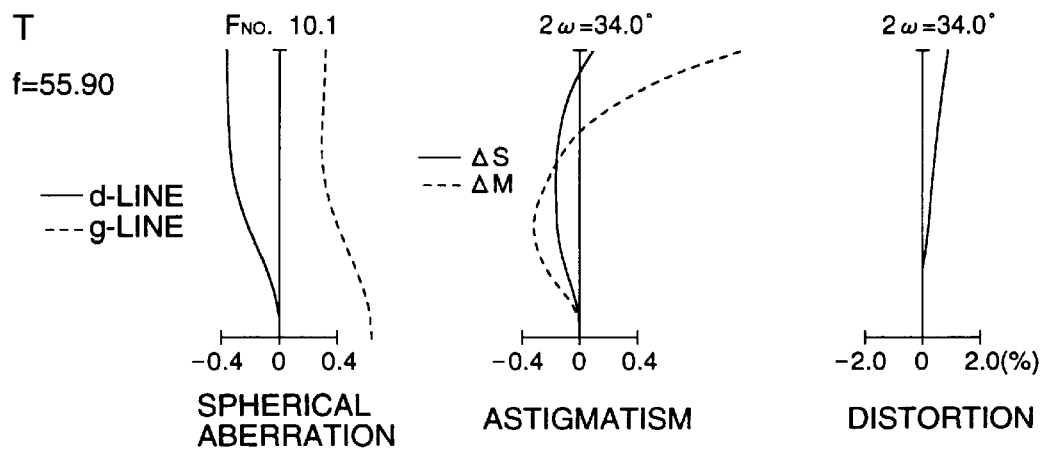

W
f=22.88
— d-LINE
--- g-LINE

F$_{NO.}$ 5.0

-1.0  0  1.0

SPHERICAL
ABERRATION

2ω=72.9°
— ΔS
--- ΔM

-0.4  0  0.4

ASTIGMATISM

2ω=72.9°

-2.0  0  2.0(%)

DISTORTION

M
f=34.64
— d-LINE
--- g-LINE

F$_{NO.}$ 6.3

-1.0  0  1.0

SPHERICAL
ABERRATION

2ω=52.1°
— ΔS
--- ΔM

-0.4  0  0.4

ASTIGMATISM

2ω=52.1°

-2.0  0  2.0(%)

DISTORTION

T
f=57.60
— d-LINE
--- g-LINE

F$_{NO.}$ 10.1

-1.0  0  1.0

SPHERICAL
ABERRATION

2ω=33.2°
— ΔS
--- ΔM

-0.4  0  0.4

ASTIGMATISM

2ω=33.2°

-2.0  0  2.0(%)

DISTORTION

FIG. 12(A)-1  FIG. 12(A)-2  FIG. 12(A)-3
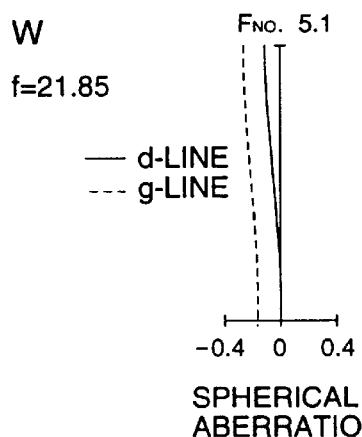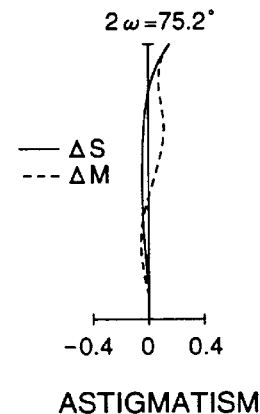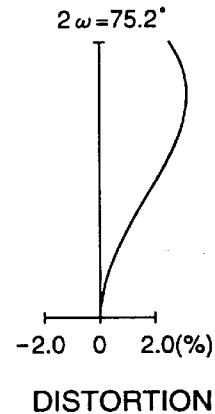
FIG. 12(B)-1  FIG. 12(B)-2  FIG. 12(B)-3
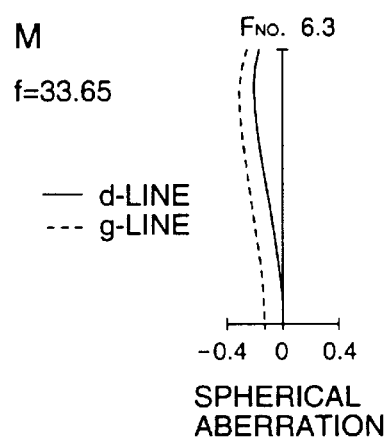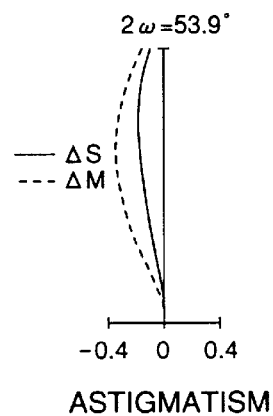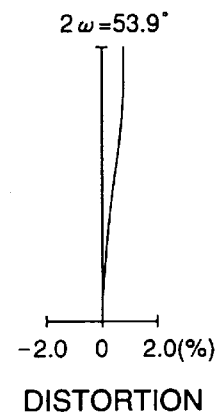
FIG. 12(C)-1  FIG. 12(C)-2  FIG. 12(C)-3
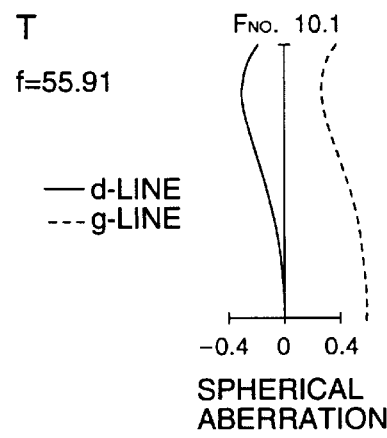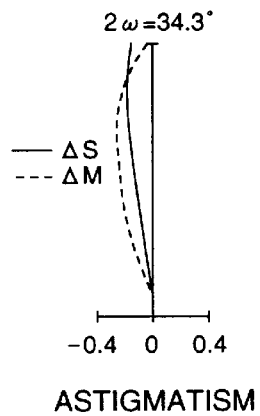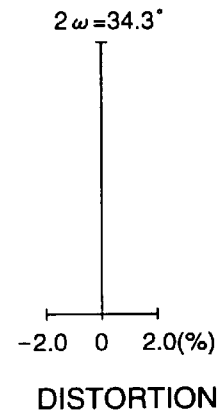

ZOOM LENS HAVING TWO LENS GROUPS

BACKGROUND OF THE INVENTION

The present invention relates to a zoom lens, and in particular, to a small-sized zoom lens suitable for a lens shutter camera having less restriction of a back focus.

It has been known that a zoom lens having two lens groups composed of a first lens group having positive refracting power and a second lens group having negative refracting power both arranged in this order from an object is right fit for a small-sized zoom lens used in a compact camera, because it is simple in structure and short in total lens length.

However, a zoom lens for a compact camera is requested to have higher variable power, to cover a wider angle and to be more compact, and a conventional zoom lens having two lens groups which has high variable power ratio of 2.5 or more, for example, has not covered a wide angle or has been insufficient in terms of compactness.

An object of the invention is to solve the problems mentioned above and to provide a zoom lens which has a variable power ratio of 2.5 or more and a field angle of 70° or more at a wide angle end and is compact and excellent in image forming power. It is further preferable that the invention provides a compact camera having a zoom lens. In particular, the invention is preferably applied to a zoom lens having two lens groups and to a camera which is equipped with a zoom lens having two lens groups.

Aforementioned objects can be attained by the following structures.

Structure (1): A zoom lens for photographing including a first lens group having positive refracting power and a second lens group having negative refracting power both arranged in this order from an object, conducting variable power by changing a distance between the first lens group and the second lens group, and having a variable power ratio of 2.5 or greater and a field angle of not less than 70° at a wide angle end, wherein the following conditions are satisfied;

$$1.25 \leq Tw/Tt \leq 1.8 \quad (1)$$

$$0.60 \leq fFc/fw \leq 0.9 \quad (2)$$

wherein,

Tw: Telephoto ratio at a wide angle end
Tt: Telephoto ratio at a telephoto end
fw: Focal length at a wide angle end
fFc: Focal length of a first lens group.

Structure (2): A zoom lens having wherein the conditions in Structure (1) are satisfied and the following conditions are satisfied;

$$0.65 \leq |fRc|/fFc \leq 1.3 \quad (3)$$

wherein, fRc: Focal length of a second lens group
fFc: Focal length of the first lens group.

Structure (3): A zoom lens wherein the conditions in Structure (1) are satisfied, the first lens group is composed of a first sub-unit having negative refracting power and a second sub-unit having positive refracting power both arranged in this order from an object across the air distance on the optical axis which is the longest in the first lens group, the first sub-unit is composed of two lenses one of which is a negative lens which is closer to an object, the second sub-unit is composed of one negative lens and one positive lens, or composed of one negative lens and two positive lenses, and the second lens group is composed of two lenses.

Structure (4): A zoom lens wherein the conditions in Structure (1) are satisfied, the first lens group is composed of a first sub-unit having positive refracting power and a second sub-unit having positive refracting power both arranged in this order from an object across the air distance on the optical axis which is the longest in the first lens group, the first sub-unit is composed of two lenses, and the second sub-unit is composed of one negative lens and one positive lens, or of a 3-element type composed of one negative lens and two positive lenses, and the second lens group is composed of two lenses.

Structure (5): A zoom lens wherein the conditions in Structure (1) are satisfied, the second lens group is composed of a negative lens and a negative meniscus lens whose concave surface faces an object both arranged in this order from an object, the aforementioned negative lens is an aspherical lens whose lens thickness on its periphery is thinner than that on a spherical surface having the same paraxial curvature, and the following condition is satisfied;

$$0.50 \leq |fRc2|/fw \leq 0.9 \quad (4)$$

wherein, fRc2: Focal length of a negative meniscus lens
fw: Focal length at a wide angle end incidentally, ranges of preferable conditional expressions are as follows.

$$1.46 \leq Tw/Tt \leq 1.7 \quad (1')$$

$$0.72 \leq |fFc|/fw \leq 0.85 \quad (2')$$

$$0.75 \leq |fRc|/fFc \leq 0.9 \quad (3')$$

$$0.55 \leq |fRc2|/fw \leq 0.7 \quad (4')$$

Conditional expression (1) stipulates an appropriate range of the ratio of a telephoto ratio at a wide angle end to a telephoto ratio at a telephoto end. The telephoto ratio is defined as a ratio of the total length including a back focus, namely an axial distance from the lens surface closest to an object to the image forming plane to a focal length of a total zoom lens system, and when Lw represents a total length including a back focus at a wide angle end, namely an axial distance from the lens surface closest to an object at a wide angle end to the image forming plane, Lt represents a total length including a back focus at a telephoto end, namely an axial distance from the lens surface closest to an object at a telephoto end to the image forming plane, fw represents a focal length of a total zoom lens system at a wide angle end, and ft represents a focal length of a total zoom lens system at a telephoto end, the following expressions hold, $$Tw=Lw/fw, Tt=Lt/ft$$

therefore, the following expression holds.

$$Tw/Tt=(Lw/Lt)\cdot(ft/fw)$$

For compactness which is one of those to be solved in the invention, it is especially necessary that total length Lt including a back focus at a telephoto end is short.

In addition to this, a great variable power ratio and a short focal length at a wide angle end which represent other problems awaiting solution in the invention are concentrated on the lower limit of the conditional expression (1), and when this lower limit is exceeded, it is difficult to obtain a compact zoom lens having a variable power ratio of 2.5 or more and a field angle of not less than 70° at a wide angle end, especially a compact zoom lens having two lens groups. When an upper limit is exceeded, it is difficult to obtain an excellent image forming power.

Conditional expression (2) stipulates an appropriate range of a focal length of the first lens group.

When a focal length at a wide angle end is short as in the invention, a back focus tends to be short at the wide angle end, and there are easily caused problems that a rear lens system turns out to be big to make a camera big too, or fine dust particles sticking to the rear lens appear as images. When a focal length of the first lens group exceeds the lower limit of the conditional expression (2) to be short, it is difficult to secure a back focus necessary at a wide angle end. Further, a large lateral magnification of the second group is needed, which makes aberration correction difficult. When the upper limit is exceeded, a total length including a back focus is made long at all zooming areas, which makes compactness to be lost.

Conditional expression (3) stipulates an appropriate range of a ratio of a focal length of the second lens group to a focal length of the first lens group. When this range is satisfied, an amount of movement of the second lens group in zooming can be made small to attain further compactness, and fluctuations of astigmatism in zooming can further be restrained, which is preferable.

The lens composition in Structure (3) is advantageous for securing a ratio of brightness of the edge of image field necessary at a wide angle end and a back focus by making the first sub-unit having negative refracting power to precede, and the lens composition described makes it possible to obtain a field angle of about 75 degrees.

The lens composition in Structure (4) is advantageous for making a telephoto ratio to be smaller. In the lens composition of Structure (3) or (4), it is preferable that at least one positive or negative lens in the first sub-unit has an aspherical surface which makes a lens thickness at a peripheral area of the lens to be greater than that relating to the spherical surface having the same paraxial curvature. This aspherical surface makes it possible to correct the distortion at a wide angle end which is excessively positive.

In the lens composition in Structure (5), the second lens group is composed of two negative lenses. There has been known an example wherein the second lens group is composed of one positive lens and one negative lens whose concave surface faces an object. In this case, however, when trying to make the power of the second lens group to be stronger for compactness, the curvature of a concave surface of the negative lens closer to an object is made to be greater, which makes it difficult to polish a glass lens due to its deep surface. This problem can be solved by composing the second lens group with two negative lenses and thereby dispersing the power as in Structure (5). Further, due to lens LRc1 closer to an object having negative power, when there is provided an aspherical surface which makes a lens thickness at a peripheral area of the lens to be smaller than that relating to the spherical surface having the same paraxial curvature, it is possible to increase an amount of displacement of the aspherical surface, while leaving the thin central lens thickness intact. It is therefore possible to correct aberration dynamically while keeping compactness in the case of correction of distortion. Incidentally, when a focal length at a telephoto end is not so long as in the invention, it is possible to limit longitudinal chromatic aberration within a practical range even if the second lens group is composed only of negative lenses. For cost reduction, on the other hand, it is preferable that LRc1 is a plastic lens and LRc2 is a glass lens.

It is further desirable that the first sub-unit of the first lens group has an aspherical lens made of plastic. In addition, it is preferable that a lens closest to an object in the first lens group is a positive lens, and it is more preferable that the lens is an aspherical lens.

Conditional expression (4) stipulates an appropriate range of a focal length of negative meniscus lens LRc2 whose concave surface faces an object in the second lens group in the lens composition of Structure (5). When this range is satisfied, LRc2 can be made to be more appropriate in terms of power, and glass polishing is easier when LRc2 is a glass lens, which is preferable. When the range stated above is satisfied, LRc1 can be made to be more appropriate in terms of negative power, and shift of focus caused by temperature fluctuations can be made less when LRc1 is a plastic lens, which is also preferable.

The lens composition in Structure (6) is a simple one wherein the number of lenses in the second lens group is as small as two lenses, which represents a zoom lens having two lens groups which is suitable for a compact camera.

Incidentally, the invention is especially effective in a zoom lens having two lens groups and a camera equipped with a zoom lens having two lens groups. However, other lens groups may also be incorporated, and a third lens group may be provided on the side of the second lens group closer to an image, for example. It is preferable that the first lens group is provided to be closest to an object. The second lens group is preferably arranged next to the side of the first lens group closer to an image. When providing a stop in a zoom lens, the stop may be provided either between the first lens group and the second lens group, or inside the first lens group.

Incidentally, in the invention, when a plastic lens is used, it is preferable that the plastic lens is made of polycarbonate, acrylic resin, polystyrene or polyolefin.

Though it is desirable that the invention is applied to a camera for a silver halide film use, it is also possible to apply to a digital still camera.

BRIEF DESCRIPTION OF THE DRAWINGS

FIG. 1 is a sectional view of an optical system in Example 1.

FIGS. 2(A)-1 through 2(A)-3, 2(B)-1 through 2(B)-3 and 2(C)-1 through 2(C)-3 show aberration diagrams respectively at a short focal length end W, a medium focal length M and a long focal length end T in Example 1.

FIG. 3 is a sectional view of an optical system in Example 2.

FIGS. 4(A)-1 through 4(A)-3, 4(B)-1 through 4(B)-3 and 4(C)-1 through 4(C)-3 show aberration diagrams respectively at a short focal length end W, a medium focal length M and a long focal length end T in Example 2.

FIGS. 6(A)-1 through 6(A)-3, 6(B)-1 through 6(B)-3 and 6(C)-1 through 6 (C)-3 show aberration diagrams respectively at a short focal length end W, a medium focal length M and a long focal length end T in Example 3.

FIGS. 8(A)-1 through 8(A)-3, 8(B)-1 through 8(B)-3 and 8(C)-1 through 8 (C)-3 show aberration diagrams respectively at a short focal length end W, a medium focal length M and a long focal length end T in Example 4.

FIGS. 10(A)-1 through 10(A)-3, 10(B)-1 through 10(B)-3 and 10(C)-1 through 10(C)-3 show aberration diagrams respectively at a short focal length end W, a medium focal length M and a long focal length end T in Example 5.

FIGS. 12(A)-1 through 12(A)-3, 12(B)-1 through 12(B)-3 and 12(C)-1 through 12(C)-3 show aberration diagrams respectively at a short focal length end W. a medium focal length M and a long focal length end T in Example 6.

DETAILED DESCRIPTION OF THE PREFERRED EMBODIMENT

EXAMPLE

Six types of examples of a zoom lens having two lens groups in the invention will be shown below. Symbols in each example are as follows.
f: Focal length of a total system
$F_{NO}$: F-number
fb: Back focus
ω: Half field angle
r: Radius of curvature on lens refracting surface
d: Distance between lens refracting surfaces
Nd: Refractive index for d line (588 nm) of lens material
vd: Abbe's number for d line (588 nm) of lens material
1G: First lens group
2G: Second lens group
K: Conical constant
A 4, A6, A8, A 10 and A12: Aspherical coefficient
Tw: Telephoto ratio at wide angle end
Tt: Telephoto ratio at telephoto end
fw: Focal length at wide angle end
fFc: Focal length of first lens group
fRc: Focal length of second lens group
fRc2: Focal length of negative meniscus lens Example 1

Example 1 is an example corresponding to Structures (1), (2), (3), (5) and (6).

Figures 1, 6A:
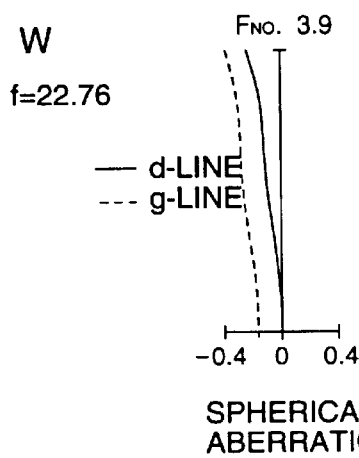
Figures 2, 6A:
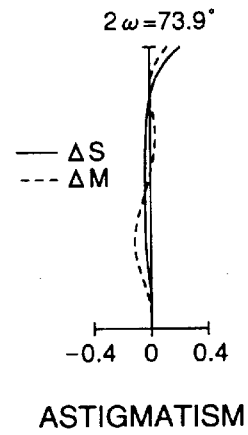
Figures 3, 6A:
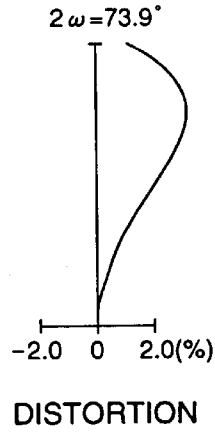
Figures 1, 6B:
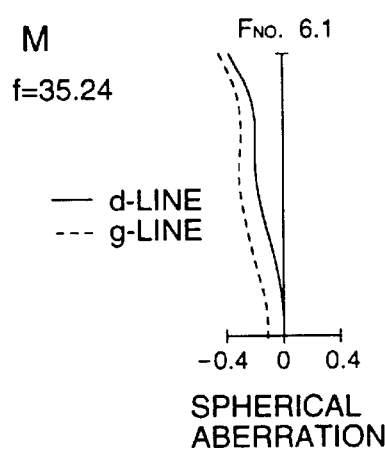
Figures 2, 6B:
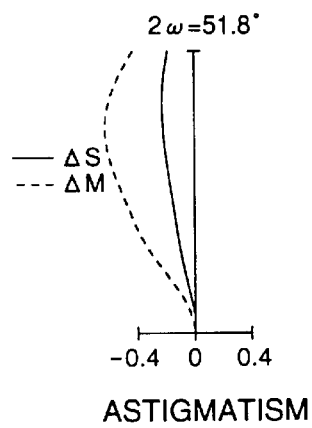
Figures 3, 6B:
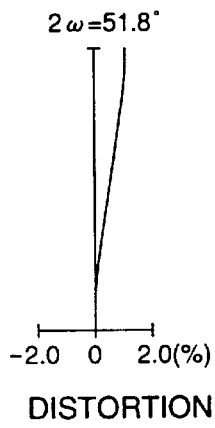
Figures 1, 6C:
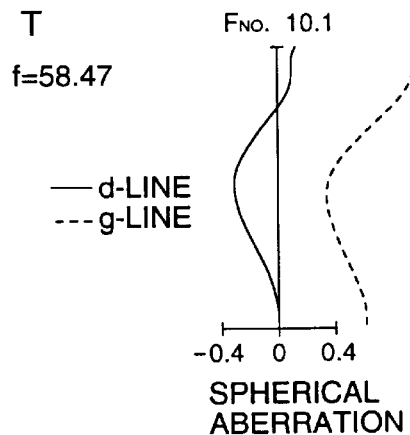
Figures 2, 6C:
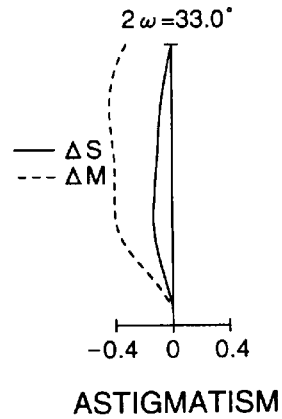
Figures 3, 6C:
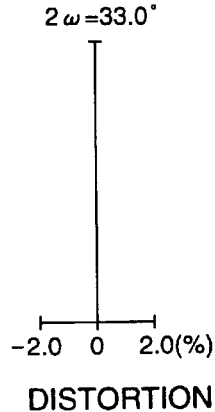

FIG. 1 is a sectional view of an optical system of a zoom lens having two lens groups of the invention. First lens group 1G is composed of first sub-unit I which is of 2-element construction having a negative lens closer to an object and has negative refracting power and of second sub-unit II which is composed of one negative lens and two positive lenses and has positive refracting power. The second lens group 2G is composed of two lenses. A represents a stop.

The second and sixth lenses from an object side are made of polycarbonate resin, and remaining lenses are glass lenses.

FIGS. 2(A)-1 through 2(C)-3 represent lens aberration diagrams showing spherical aberration, astigmatism and distortion, and FIGS. 2(A)-1, 2(A)-2 and 2(A)-3 represent aberration diagrams at a short focal length end W, FIGS. 2(B)-1, 2(B)-2 and 2(B)-3 represent aberration diagrams at a medium focal length M and FIGS. 2(C)-1, 2(C)-2 and 2(C)-3 show aberration diagrams at a long focal length end T.

TABLE 1 f = 21.86–56.02   $F_{NO}$ = F5–F10.09
fb = 3.72–32.70   2ω = 75.29°–34.16°

| Surface number | r(mm) | d(mm) | Nd | vd |
|---|---|---|---|---|
| 1 | ∞ | 0.80 | 1.84666 | 23.8 |
| 2 | 60.623 | 0.50 | | |
| 3* | 34.376 | 1.20 | 1.58300 | 30.0 |
| 4* | 35.015 | 3.40 | | |
| 5 | −41.798 | 0.60 | 1.83400 | 37.2 |
| 6 | 17.319 | 2.10 | 1.58144 | 40.7 |
| 7 | −17.407 | 0.20 | | |
| 8 | 39.615 | 2.60 | 1.51633 | 64.1 |
| 9 | −9.959 | (Variable)★ | | |
| 10 | 97.625 | 1.70 | 1.58300 | 30.0 |
| 11* | 58.748 | 5.65 | | |
| 12 | −7.817 | 0.80 | 1.77250 | 49.6 |
| 13 | −25.201 | | | |

*Aspherical surface
A stop is positioned behind the 9th surface to be away from it by 0.6 mm.

TABLE 2

| ★f | 21.86 | 35.16 | 56.02 |
|---|---|---|---|
| d(9) | 8.8 | 4.83 | 2.40 |

TABLE 3

| Surface number | Aspherical coefficient |
|---|---|
| 3rd surface | K = 1.41682 × 10<br>A4 = −2.15469 × $10^{-4}$<br>A6 = −3.38084 × $10^{-6}$<br>A8 = −5.67767 × $10^{-8}$<br>A10 = −1.90293 × $10^{-11}$ |
| 4th surface | K = 1.22770 × 10<br>A4 = 1.49718 × $10^{-4}$<br>A6 = 1.58088 × $10^{-6}$<br>A8 = −6.22027 × $10^{-8}$<br>A10 = 2.57354 × $10^{-9}$ |
| 10th surface | K = −7.57405 × 10<br>A4 = 1.49179 × $10^{-4}$<br>A6 = −8.45179 × $10^{-7}$<br>A8 = 1.42341 × $10^{-7}$<br>A10 = −4.16982 × $10^{-9}$<br>A12 = 6.14528 × $10^{-11}$ |
| 11th surface | K = −5.00383 × 10<br>A4 = 2.91217 × $10^{-4}$<br>A6 = −1.35441 × $10^{-5}$<br>A8 = 5.91198 × $10^{-7}$<br>A10 = −1.40109 × $10^{-8}$<br>A12 = 1.47158 × $10^{-10}$ |

Table 1 shows lens data in Example 1. Table 2 shows variable focal length f of the total system and a variable distance between the first lens group 1G and the second lens group 2G. Table 3 shows an aspherical coefficient of an aspherical lens.

A form of an aspherical surface is expressed by the following expression, when an X-axis of coordinates is taken in the direction of an optical axis and h represents a height in the direction perpendicular to the optical axis.

$$X = \frac{h^2/r}{1+\sqrt{1-(1+K)h^2/r^2}} + A_4 \cdot h^4 + A_6 \cdot h^6 + A_8 \cdot h^8 +$$
$$A_{10} \cdot h^{10} + A_{12} \cdot h^{12}$$

Variable power ratio: 2.56 (see Table 2, f: 21.86 mm–56.02 mm)

Field angle at wide angle end 2ω=75.29° (see Table 1)

Tw/Tt=1.5
Tt=0.98
fFc/fw=0.75
|fRc|/fFc=0.85
|fRc2|/fw=0.68
Lw=32.07
Lt=54.66
fw=21.86
ft=56.02

Example 2

Example 2 is an example corresponding to Structures (1), (2), (3), (5) and (6), which is the same as Example 1.

Figure 3:
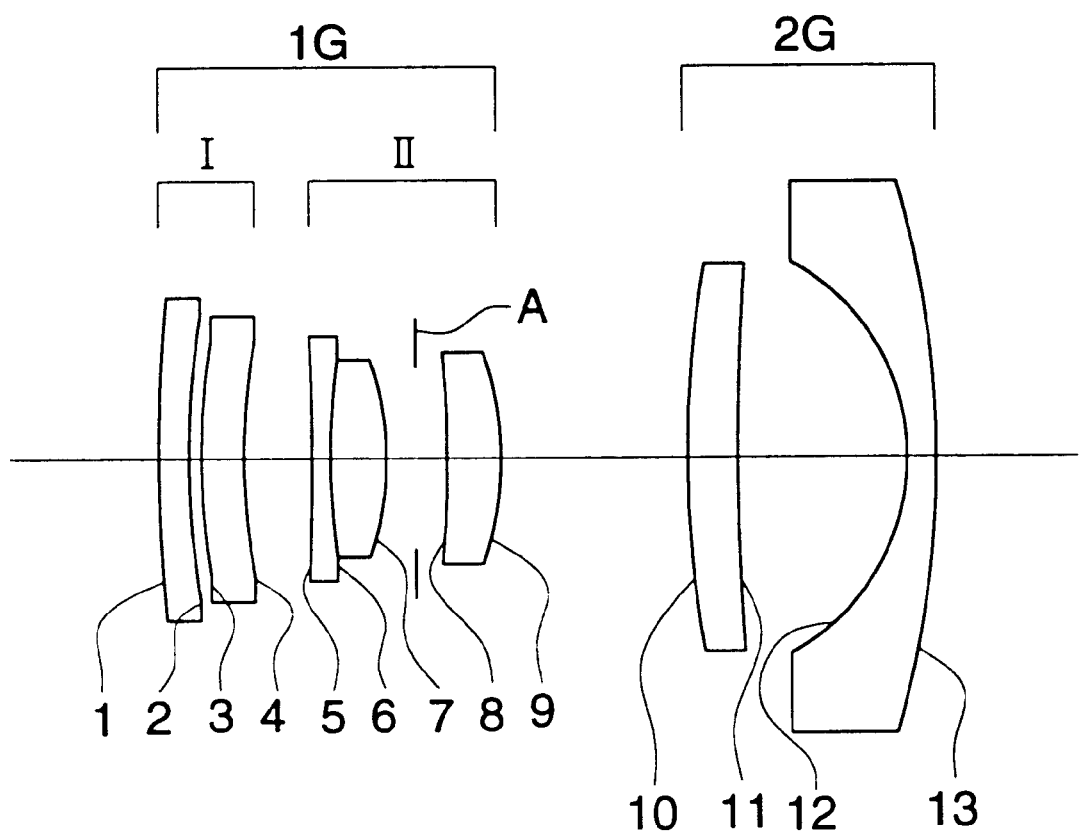

FIG. 3 is a sectional view of an optical system of a zoom lens having two lens groups of the invention. First lens group 1G is composed of first sub-unit I which is of 2-element construction having a negative lens closer to an object and has negative refracting power and of second sub-unit II which is composed of one negative lens and two positive lenses and has positive refracting power. The second lens group 2G is composed of two lenses. A stop is represented by A.

The second and sixth lenses from an object side are made of acrylic resin, and remaining lenses are glass lenses.

FIGS. 4(A)-1 through 4(C)-3 represent lens aberration diagrams showing spherical aberration, astigmatism and distortion, and FIGS. 4(A)-1, 4(A)-2 and 4(A)-3 represent aberration diagrams at a short focal length end W, FIGS. 4(B)-1, 4(B)-2 and 4(B)-3 represent aberration diagrams at a medium focal length M and FIGS. 4(C)-1, 4(C)-2 and 4(C)-3 show aberration diagrams at a long focal length end T.

TABLE 4 f = 21.84–55.45  $F_{NO}$ = F5–F10.09
fb = 4.68–32.75  2ω = 75.02°–34.29°

| Surface number | r(mm) | d(mm) | Nd | νd |
|---|---|---|---|---|
| 1 | ∞ | 0.80 | 1.80518 | 25.4 |
| 2 | 50.078 | 0.50 | | |
| 3* | 35.000 | 1.20 | 1.49700 | 56.0 |
| 4* | 34.558 | 2.22 | | |
| 5 | −61.877 | 0.70 | 1.83400 | 37.2 |
| 6 | 50.732 | 1.68 | 1.51633 | 64.1 |
| 7 | −10.760 | 2.00 | | |
| 8 | −52.153 | 1.84 | 1.48749 | 70.2 |
| 9 | −8.814 | (Variable)★ | | |
| 10* | 140.000 | 1.70 | 1.49700 | 56.0 |
| 11* | 127.000 | 5.47 | | |
| 12 | −7.200 | 0.80 | 1.72916 | 54.7 |
| 13 | −31.248 | | | |

*Aspherical surface
A stop is positioned behind the 7th surface to be away from it by 1.0 mm.

TABLE 5

| ★f | 21.84 | 34.92 | 55.45 |
|---|---|---|---|
| d(9) | 6.20 | 2.74 | 0.6 |

TABLE 6

| Surface number | Aspherical coefficient |
|---|---|
| 3rd surface | K = 3.96770 × 10 |
| | A4 = −3.31500 × 10$^{-4}$ |
| | A6 = −1.40180 × 10$^{-5}$ |
| | A8 = 1.34220 × 10$^{-7}$ |
| | A10 = −8.89400 × 10$^{-9}$ |
| 4th surface | K = 3.70270 × 10 |
| | A4 = 2.78700 × 10$^{-4}$ |
| | A6 = −9.65830 × 10$^{-6}$ |
| | A8 = 4.96530 × 10$^{-7}$ |
| | A10 = −1.91210 × 10$^{-8}$ |
| 10th surface | K = 3.68650 × 10$^{2}$ |
| | A4 = 1.41330 × 10$^{-5}$ |
| | A6 = 2.26400 × 10$^{-6}$ |
| | A8 = −1.14910 × 10$^{-8}$ |
| | A10 = 2.51960 × 10$^{-10}$ |
| | A12 = 2.51090 × 10$^{-11}$ |
| 11th surface | K = −3.76470 × 10$^{3}$ |
| | A4 = 4.60390 × 10$^{-5}$ |
| | A6 = −1.15320 × 10$^{-5}$ |
| | A8 = 4.59950 × 10$^{-7}$ |
| | A10 = −1.07270 × 10$^{-8}$ |
| | A12 = 1.17140 × 10$^{-10}$ |

Table 4 shows lens data in Example 2. Table 5 shows variable focal length f of the total system and a variable distance between the first lens group 1G and the second lens group 2G. Table 6 shows an aspherical coefficient of an aspherical lens.

Variable power ratio: 2.54 (see Table 5, f: 21.84 mm–55.45 mm)

Field angle at wide angle end 2ω=75.02° (see Table 4)

Tw/Tt=1.45
Tt=0.94
fFc/fw=0.71
|fRc|/fFc=0.84
|fRc2|/fw=0.60
Lw=29.77
Lt=52.25
fw=21.84
ft=55.45

Example 3

Example 3 is an example corresponding to Structures (1), (3), (5) and (6).

Figure 5:
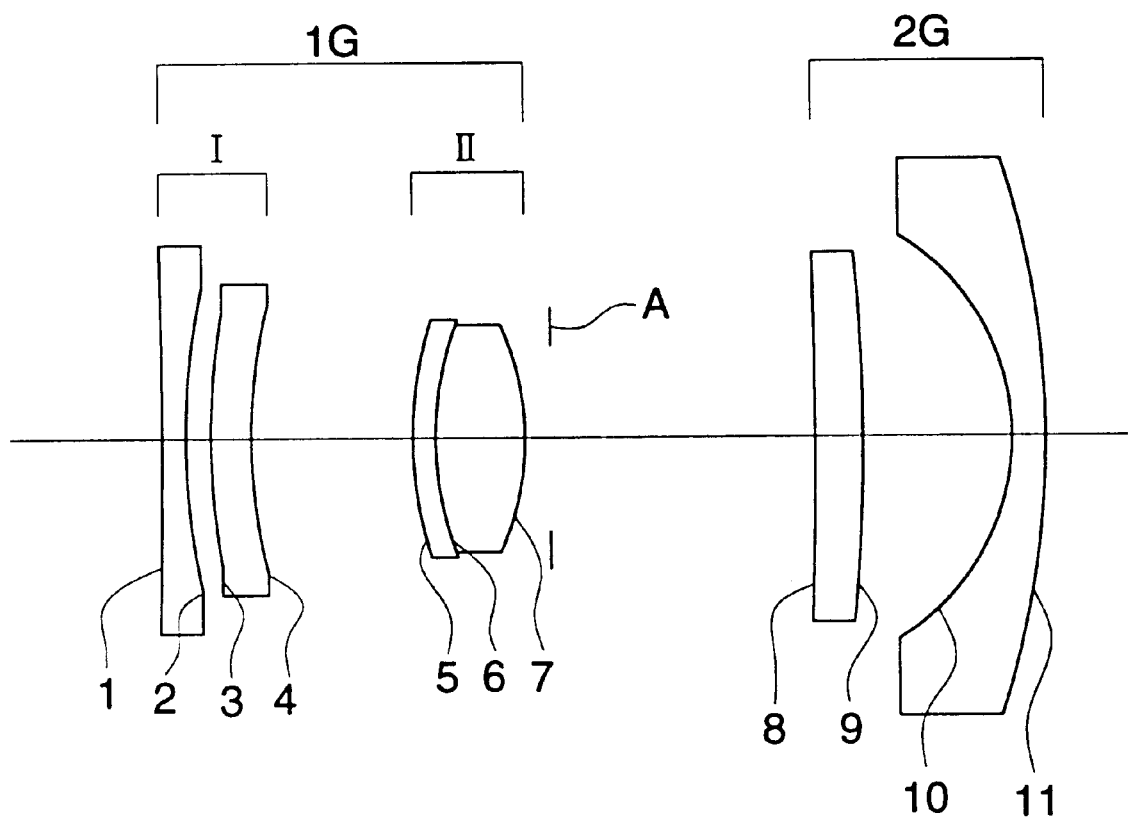
FIG. 5 is a sectional view of an optical system in Example 3.

FIG. 5 is a sectional view of an optical system of a zoom lens having two lens groups of the invention. First lens group 1G is composed of first sub-unit I which is of 2-element construction having a negative lens closer to an object and has negative refracting power and of second sub-unit II which is composed of one negative lens and one positive lens and has positive refracting power. The second lens group 2G is composed of two lenses. A stop is represented by A.

The second lens from an object side is made of polycarbonate resin, fifth lens from an object side is made of acrylic resin, and remaining lenses are glass lenses.

FIGS. 6(A)-1 through 6(C)-3 represent lens aberration diagrams showing spherical aberration, astigmatism and distortion, and FIGS. 6(A)-1, 6(A)-2 and 6(A)-3 represent aberration diagrams at a short focal length end W, FIGS. 6(B)-1, 6(B)-2 and 6(B)-3 represent aberration diagrams at a medium focal length M and FIGS. 6(C)-1, 6(C)-2 and 6(C)-3 show aberration diagrams at a long focal length end T.

TABLE 7 f = 22.76–58.47   $F_{NO}$ = F3.9–F10.09
fb = 3.60–36.64   $2\omega$ = 73.87°–32.97°

| Surface number | r(mm) | d(mm) | Nd | νd |
|---|---|---|---|---|
| 1 | ∞ | 1.00 | 1.83400 | 37.2 |
| 2 | 35.080 | 0.90 | | |
| 3* | 36.014 | 1.50 | 1.58300 | 30.0 |
| 4* | 35.462 | 5.88 | | |
| 5 | 15.665 | 0.80 | 1.83400 | 37.2 |
| 6 | 11.502 | 3.33 | 1.48749 | 70.2 |
| 7* | −10.284 | (Variable)★ | | |
| 8* | −81.497 | 1.70 | 1.49700 | 56.0 |
| 9 | −92.585 | 5.55 | | |
| 10 | −8.381 | 1.20 | 1.77250 | 49.6 |
| 11 | −30.243 | | | |

*Aspherical surface
A stop is positioned behind the 7th surface to be away from it by 0.6 mm.

TABLE 8

| ★f | 22.76 | 35.24 | 58.47 |
|---|---|---|---|
| d(7) | 10.1 | 6.04 | 3.10 |

TABLE 9

| Surface number | Aspherical coefficient | |
|---|---|---|
| 3rd surface | K = −4.31020 × 10⁻¹ | |
| | A4 = −1.46800 × 10⁻⁴ | P1 = 4.0000 |
| | A6 = 2.44340 × 10⁻⁶ | P2 = 6.0000 |
| | A8 = −7.71060 × 10⁻⁸ | P3 = 8.0000 |
| | A10 = −2.19670 × 10⁻¹⁰ | P4 = 10.0000 |
| 4th surface | K = −8.05060 × 10⁻² | |
| | A4 = 7.51660 × 10⁻⁵ | P1 = 4.0000 |
| | A6 = 4.90710 × 10⁻⁶ | P2 = 6.0000 |
| | A8 = −7.31300 × 10⁻⁸ | P3 = 8.0000 |
| 7th surface | K = −2.08470 × 10⁻² | |
| | A4 = 7.66250 × 10⁻⁵ | P1 = 4.0000 |
| | A2 = 3.83470 × 10⁻⁶ | P2 = 6.0000 |
| | A3 = −6.08100 × 10⁻⁸ | P3 = 8.0000 |
| | A4 = −1.55870 × 10⁻⁸ | P4 = 10.0000 |
| | A12 = 6.97080 × 10⁻¹⁰ | P5 = 12.0000 |
| 8th surface | K = 4.85350 × 10 | |
| | A4 = 1.75500 × 10⁻⁴ | P1 = 4.0000 |
| | A2 = 3.32700 × 10⁻⁶ | P2 = 6.0000 |
| | A3 = −2.10220 × 10⁻⁷ | P3 = 8.0000 |
| | A4 = 3.50960 × 10⁻⁹ | P4 = 10.0000 |
| | A12 = −2.04210 × 10⁻¹¹ | P5 = 12.0000 |

Table 7 shows lens data in Example 3. Table 8 shows variable focal length f of the total system and a variable distance between the first lens group 1G and the second lens group 2G. Table 9 shows an aspherical coefficient of an aspherical lens.

Variable power ratio: 2.57 (see Table 8, f: 22.76 mm–58.47 mm)
Field angle at wide angle end $2\omega$=73.87° (see Table 7)
Tw/Tt=1.65
Tt=1.03
fFc/fw=0.76
|fRc|/fFc=0.87
|fRc2|/fw=0.68
Lw=36.37
Lt=60.41
fw=22.76
ft=58.47

Example 4

Example 4 is an example corresponding to Structures (1), (2), (4), (5) and (6).

Figure 7:
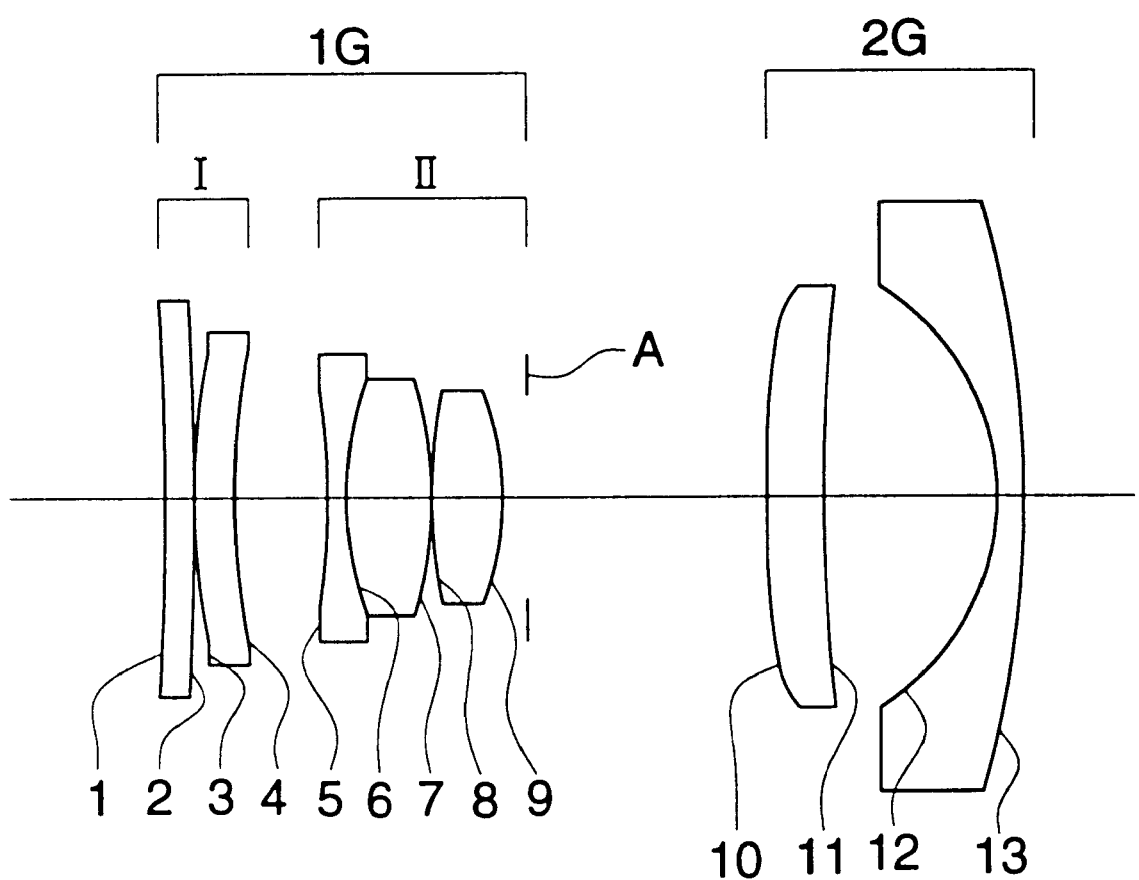
FIG. 7 is a sectional view of an optical system in Example 4.

FIG. 7 is a sectional view of an optical system of a zoom lens having two lens groups of the invention. First lens group 1G is composed of first sub-unit I which is of 2-lens construction and has positive refracting power and of second sub-unit II which is composed of one negative lens and two positive lenses and has positive refracting power. The second lens group 2G is composed of two lenses. A stop is represented by A.

The second and sixth lenses from an object side are made of polycarbonate resin, and remaining lenses are glass lenses.

FIGS. 8(A)-1 through 8(C)-3 represent lens aberration diagrams showing spherical aberration, astigmatism and distortion, and FIGS. 8(A)-1, 8(A)-2 and 8(A)-3 represent aberration diagrams at a short focal length end W, FIGS. 8(B)-1, 8(B)-2 and 8(B)-3 represent aberration diagrams at a medium focal length M and FIGS. 8(C)-1, 8(C)-2 and 8(C)-3 show aberration diagrams at a long focal length end T.

TABLE 10 f = 21.86–55.90   $F_{NO}$ = F5–F10.09
fb = 3.78–31.31   $2\omega$ = 75.73°–34.02°

| Surface number | r(mm) | d(mm) | Nd | νd |
|---|---|---|---|---|
| 1 | −50.000 | 0.80 | 1.84666 | 23.8 |
| 2 | −73.700 | 0.20 | | |
| 3* | 31.600 | 1.20 | 1.58300 | 30.0 |
| 4* | 52.600 | 2.85 | | |
| 5 | −25.794 | 0.60 | 1.83400 | 37.2 |
| 6 | 14.032 | 2.61 | 1.48749 | 70.2 |
| 7 | −14.032 | 0.20 | | |
| 8 | 39.115 | 2.08 | 1.54072 | 47.2 |
| 9 | −9.628 | (Variable)★ | | |
| 10* | 132.000 | 1.70 | 1.58300 | 30.0 |
| 11* | 122.000 | 5.37 | | |
| 12 | −7.720 | 0.80 | 1.77250 | 49.6 |
| 13 | −32.083 | | | |

*Aspherical surface
A stop is positioned behind the 9th surface to be away from it by 0.6 mm.

TABLE 11

| ★f | 21.86 | 34.90 | 55.90 |
|---|---|---|---|
| d(9) | 8.52 | 4.77 | 2.40 |

TABLE 12

| Surface number | Aspherical coefficient |
|---|---|
| 3rd surface | K = 1.65048 × 10 |
| | A4 = −2.20445 × 10⁻⁴ |
| | A6 = −8.10618 × 10⁻⁶ |
| | A8 = 9.56180 × 10⁻⁸ |
| | A10 = −3.12273 × 10⁻⁹ |
| 4th surface | K = 8.01022 × 10 |
| | A4 = 1.32017 × 10⁻⁴ |

TABLE 12-continued

| Surface number | Aspherical coefficient |
|---|---|
| | A6 = −6.50464 × 10$^{-6}$<br>A8 = 2.63037 × 10$^{-7}$<br>A10 = −5.15944 × 10$^{-9}$ |
| 10th surface | K = −5.69095 × 10$^2$<br>A4 = 1.55268 × 10$^{-4}$<br>A6 = −1.20140 × 10$^{-6}$<br>A8 = 2.26858 × 10$^{-7}$<br>A10 = −5.54126 × 10$^{-9}$<br>A12 = 6.49605 × 10$^{-11}$ |
| 11th surface | K = −3.88048 × 10$^3$<br>A4 = 1.80721 × 10$^{-4}$<br>A6 = −1.18591 × 10$^{-5}$<br>A8 = 5.38049 × 10$^{-7}$<br>A10 = −1.15741 × 10$^{-8}$<br>A12 = 1.17495 × 10$^{-10}$ |

Table 10 shows lens data in Example 4. Table 11 shows variable focal length f of the total system and a variable distance between the first lens group 1G and the second lens group 2G. Table 12 shows an aspherical coefficient of an aspherical lens.

Variable power ratio: 2.56 (see Table 11, f: 21.86 mm–55.90 mm)

Field angle at wide angle end 2ω=75.73° (see Table 10)

Tw/Tt=1.52
Tt=0.93
fFc/fw=0.75
|fRc|/fFc=0.81
|fRc2|/fw=0.61
Lw=30.72
Lt=52.12
fw=21.86
ft=55.90

Example 5

Example 5 is an example corresponding to Structures (1), (2), (5) and (6).

Figure 9:
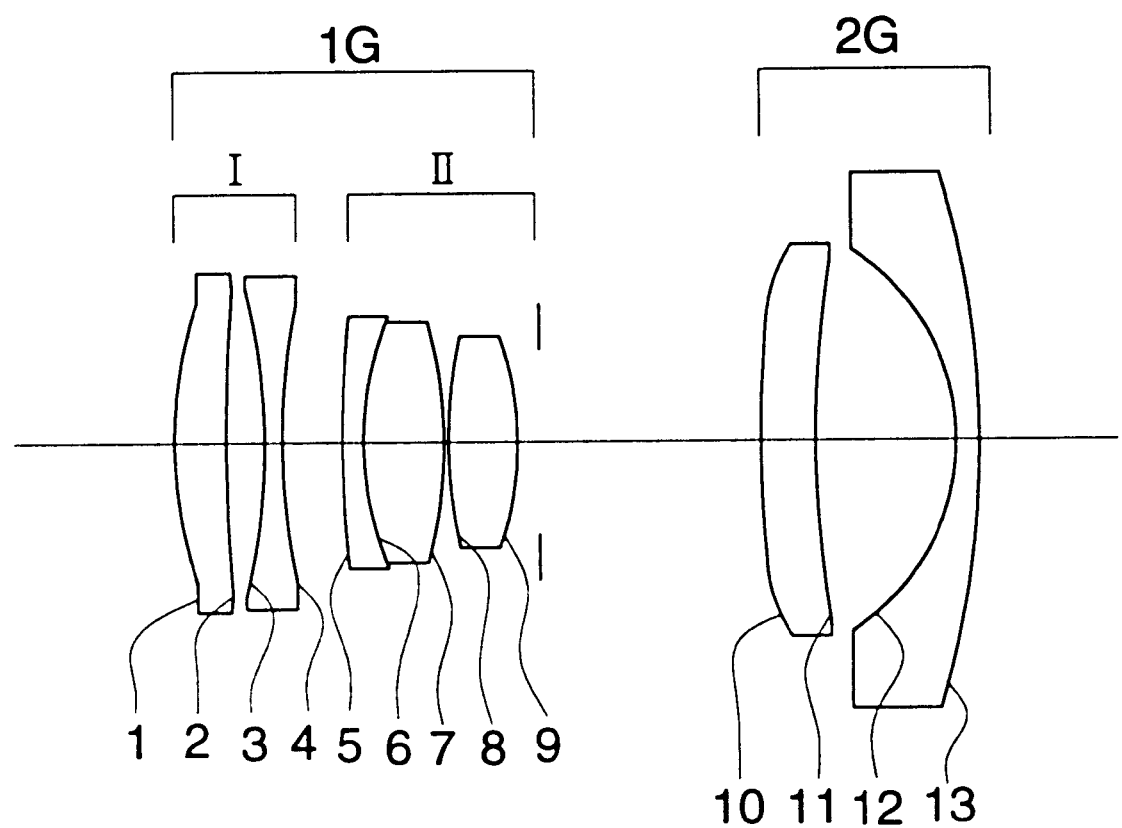
FIG. 9 is a sectional view of an optical system in Example 5.
Figures 1, 10A:
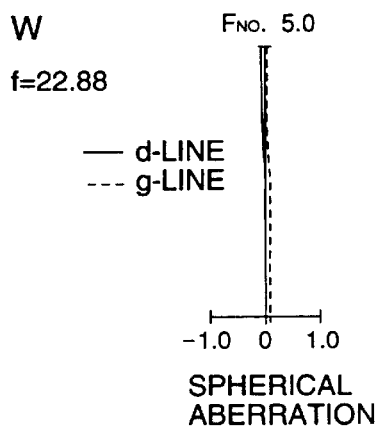
Figures 2, 10A:
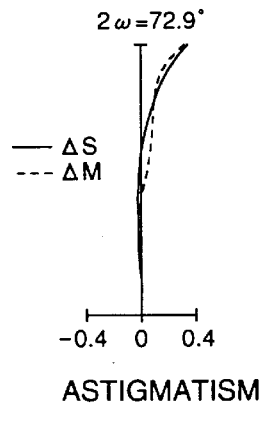
Figures 3, 10A:
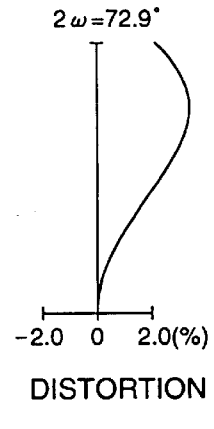
Figures 1, 10B:
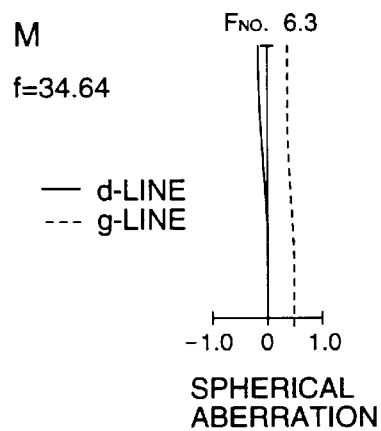
Figures 2, 10B:
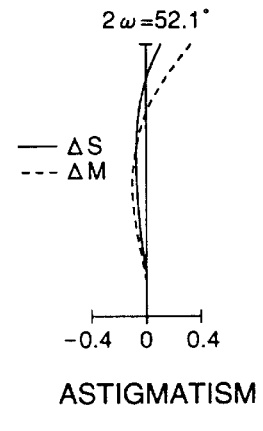
Figures 3, 10B:
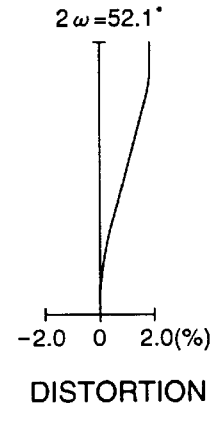
Figures 1, 10C:
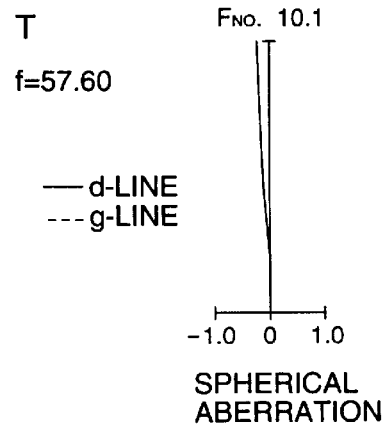
Figures 2, 10C:
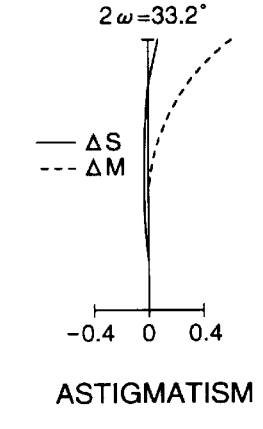
Figures 3, 10C:
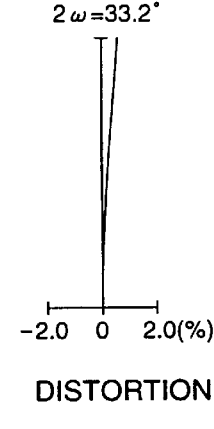

FIG. 9 is a sectional view of an optical system of a zoom lens having two lens groups of the invention. First lens group 1G is composed of first sub-unit I which is of 2-lens construction and has negative refracting power and of second sub-unit II which is composed of one negative lens and two positive lenses and has positive refracting power. The second lens group 2G is composed of two lenses. A stop is represented by A.

The sixth lens from an object side is made of polycarbonate resin, and remaining lenses are glass lenses.

FIGS. 10(A)-1 through 10(C)-3 represent lens aberration diagrams showing spherical aberration, astigmatism and distortion, and FIGS. 10(A)-1, 10(A)-2 and 10(A)-3 represent aberration diagrams at a short focal length end W, FIGS. 10(B)-1, 10(B)-2 and 10(B)-3 represent aberration diagrams at a medium focal length M and FIGS. 10(C)-1, 10(C)-2 and 10(C)-3 show aberration diagrams at a long focal length end T.

TABLE 13 f = 22.88–57.60   F$_{NO}$ = F5–F10.09
fb = 4.44–31.58   2ω = 72.90°–33.16°

| Surface number | r(mm) | d(mm) | Nd | νd |
|---|---|---|---|---|
| 1* | 15.028 | 1.70 | 1.58313 | 59.4 |
| 2* | 157.435 | 1.00 | | |
| 3 | −21.489 | 0.70 | 1.83400 | 37.2 |
| 4 | 32.423 | 2.00 | | |
| 5 | 102.535 | 0.60 | 1.83400 | 37.2 |
| 6 | 10.415 | 2.61 | 1.54072 | 47.2 |
| 7 | −15.255 | 0.20 | | |
| 8 | 22.571 | 2.09 | 1.48749 | 70.2 |
| 9 | −11.230 | (Variable)★ | | |
| 10* | 172.400 | 1.70 | 1.58300 | 30.0 |
| 11* | 169.300 | 4.38 | | |
| 12 | −7.031 | 0.80 | 1.77250 | 49.6 |
| 13 | −25.479 | | | |

*Aspherical surface
A stop is positioned behind the 9th surface to be away from it by 0.6 mm.

TABLE 14

| ★f | 22.88 | 34.64 | 57.60 |
|---|---|---|---|
| d(9) | 7.97 | 4.83 | 2.4 |

TABLE 15

| Surface number | Aspherical coefficient |
|---|---|
| 1st surface | K = −1.94280 × 10<br>A4 = −4.00520 × 10$^{-5}$<br>A6 = −4.00350 × 10$^{-6}$<br>A8 = −1.18300 × 10$^{-7}$<br>A10 = −4.62600 × 10$^{-9}$ |
| 2nd surface | K = 5.66480 × 10$^2$<br>A4 = 2.30610 × 10$^{-5}$<br>A6 = −2.85670 × 10$^{-6}$<br>A8 = −1.92700 × 10$^{-7}$<br>A10 = −1.94320 × 10$^{-9}$ |
| 10th surface | K = 7.36360 × 10$^2$<br>A4 = 2.27840 × 10$^{-4}$<br>A6 = 1.42860 × 10$^{-6}$<br>A8 = 2.14770 × 10$^{-7}$<br>A10 = −3.22610 × 10$^{-9}$<br>A12 = 3.29130 × 10$^{-11}$ |
| 11th surface | K = 7.69790 × 10$^2$<br>A4 = 1.83960 × 10$^{-5}$<br>A6 = 3.98230 × 10$^{-6}$<br>A8 = −7.06540 × 10$^{-9}$<br>A10 = 4.68890 × 10$^{-10}$<br>A12 = 4.97560 × 10$^{-11}$ |

Table 13 shows lens data in Example 5. Table 14 shows variable focal length f of the total system and a variable distance between the first lens group 1G and the second lens group 2G. Table 15 shows an aspherical coefficient of an aspherical lens.

Variable power ratio: 2.52 (see Table 14, f: 22.88 mm–57.60 mm)

Field angle at wide angle end 2ω=72.90° (see Table 13)

Tw/Tt=1.47
Tt=0.90
fFc/fw=0.72
|fRc|/fFc=0.78
|fRc2|/fw=0.56
Lw=30.19

Lt=51.76
fw=22.88
ft=57.60

Example 6

Example 6 is an example corresponding to Structures (1), (2), (3), (5) and (6), which is the same as Example 1.

Figure 11:
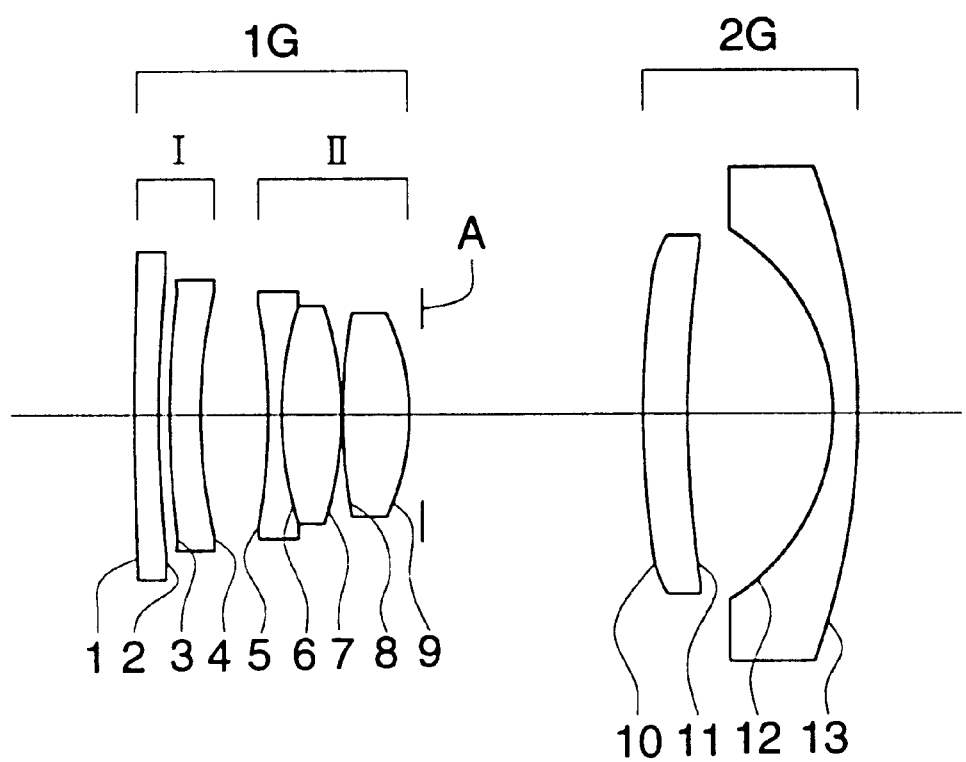
FIG. 11 is a sectional view of an optical system in Example 6.

FIG. 11 is a sectional view of an optical system of a zoom lens having two lens groups of the invention. First lens group 1G is composed of first sub-unit I which is of 2-lens construction having a negative lens on the part of an object and has negative refracting power and of second sub-unit II which is composed of one negative lens and two positive lenses and has positive refracting power. The second lens group 2G is composed of two lenses. A stop is represented by A.

The sixth lens from an object side is made of polycarbonate resin, and remaining lenses are glass lenses.

FIGS. 12(A)-1 through 12(C)-3 represent lens aberration diagrams showing spherical aberration, astigmatism and distortion, and FIGS. 12(A)-1, 12(A)-2 and 12(A)-3 represent aberration diagrams at a short focal length end W, FIGS. 12(B)-1, 12(B)-2 and 12(B)-3 represent aberration diagrams at a medium focal length M and FIGS. 12(C)-1, 12(C)-2 and 12(C)-3 show aberration diagrams at a long focal length end T.

TABLE 16 f = 21.85–55.91   $F_{NO}$ = F5.1–F10.1
fb = 3.90–33.95   $2\omega$ = 75.17°–34.30°

| Surface number | r(mm) | d(mm) | Nd | νd |
|---|---|---|---|---|
| 1 | ∞ | 0.80 | 1.84666 | 23.8 |
| 2 | 58.277 | 0.50 | | |
| 3* | 35.000 | 1.20 | 1.58300 | 30.0 |
| 4* | 34.558 | 2.57 | | |
| 5 | −24.873 | 0.60 | 1.78590 | 44.2 |
| 6 | 14.450 | 2.15 | 1.54072 | 47.2 |
| 7 | −14.474 | 0.20 | | |
| 8 | 30.390 | 2.48 | 1.48749 | 70.2 |
| 9 | −8.906 | (Variable)★ | | |
| 10* | 85.000 | 1.70 | 1.58300 | 30.0 |
| 11* | 84.250 | 5.70 | | |
| 12 | −7.789 | 0.80 | 1.77250 | 49.6 |
| 13 | −25.813 | | | |

*Aspherical surface
A stop is positioned behind the 9th surface to be away from it by 0.6 mm.

TABLE 17

| ★f | 21.85 | 33.65 | 55.91 |
|---|---|---|---|
| d(9) | 9.35 | 5.35 | 2.40 |

TABLE 18

| Surface number | Aspherical coefficient |
|---|---|
| 3rd surface | K = 9.77590 × 10 |
| | A4 = −2.90150 × $10^{-4}$ |
| | A6 = −3.05050 × $10^{-6}$ |
| | A8 = 4.95920 × $10^{-8}$ |
| | A10 = −3.36980 × $10^{-9}$ |
| 4th surface | K = −4.46100 × 10 |
| | A4 = 3.04420 × $10^{-4}$ |
| | A6 = 4.04610 × $10^{-6}$ |

TABLE 18-continued

| Surface number | Aspherical coefficient |
|---|---|
| | A8 = 4.13490 × $10^{-8}$ |
| | A10 = 1.98570 × $10^{-9}$ |
| 10th surface | K = 1.45790 × $10^{2}$ |
| | A4 = 7.59640 × $10^{-5}$ |
| | A6 = 8.40540 × $10^{-6}$ |
| | A8 = −3.93840 × $10^{-7}$ |
| | A10 = 1.04180 × $10^{-8}$ |
| | A12 = −9.10070 × $10^{-11}$ |
| 11th surface | K = −5.11660 × 10 |
| | A4 = 9.92280 × $10^{-6}$ |
| | A6 = 6.27480 × $10^{-6}$ |
| | A8 = −2.07500 × $10^{-7}$ |
| | A10 = 3.59040 × $10^{-9}$ |
| | A12 = −3.05050 × $10^{-12}$ |

Table 16 shows lens data in Example 5. Table 17 shows variable focal length f of the total system and a variable distance between the first lens group 1G and the second lens group 2G. Table 18 shows an aspherical coefficient of an aspherical lens.

Variable power ratio: 2.56 (see Table 17, f: 21.85 mm–55.91 mm)

Field angle at wide angle end $2\omega$=75.17° (see Table 16)
Tw/Tt=1.49
Tt=0.98
fFc/fw=0.77
|fRc|/fFc=0.88
|fRc2|/fw=0.67
Lw=31.95
Lt=55.05
fw=21.85
ft=55.91

The invention makes it possible to obtain a zoom lens which has a variable power ratio of 2.5 power or higher and a field angle at a wide angle end of 70° or more and yet is compact and has excellent image forming capability in which various aberrations are corrected satisfactorily as shown in each aberration diagram, and to obtain a camera. In particular, the invention is appropriate in a zoom lens having two lens groups and a compact camera equipped with the zoom lens having two lens groups.

Namely, the conditional expression (1) makes it possible to obtain a compact zoom lens having a great variable power ratio, a short focal length at a wide angle end and excellent image forming capability. The conditional expression (2) makes it possible to obtain a compact zoom lens which can secure a necessary back focus at a wide angle end and can be short in its total length for all zooming areas and to obtain a camera.

Further, the conditional expression (3) makes it possible to obtain a compact zoom lens wherein fluctuations of astigmatism in zooming can be made small and an amount of movement of the second lens group can be made small.

The structure (4) makes it possible to secures a ratio of brightness of the edge of image field and a back focus which are necessary at a wide angle end. The structure (5) makes it possible to reduce distortion in a wide angle area.

The structure (6) makes it possible to correct aberrations dynamically while keeping compactness, in the case of correction of distortion.

It is further possible to obtain a zoom lens and a camera having simple structures.

Disclosed embodiment can be varied by a skilled person without departing from the spirit and scope of the invention.

What is claimed is:

1. A zoom lens comprising:

(a) a first lens group having positive refracting power; and (b) a second lens group provided on an image side of the first lens group, having negative refracting power, wherein the zooms lens has a variable power ratio of not less than 2.5 and a field angle of not less than 70° at a wide angle end, and a magnification of the zoom lens is changed by changing a distance between the first lens group and the second lens group, wherein the following conditions are satisfied, $$1.25 \leq Tw/Tt \leq 1.8$$

$$0.6 \leq fFc/fw \leq 0.9$$

where Tw represents a telephoto ratio at a wide angle end of the zoom lens, Tt represents a telephoto ratio at a telephoto end of the zoom lens, fw represents a focal length of the zoom lens at the wide angle end, and fFc represents a focal length of the first lens group, and wherein the first lens group has a first sub-unit and a second sub-unit, said second sub-unit includes one negative lens and one positive lens, or includes one negative lens and two positive lenses, wherein the first sub-unit has negative refracting power and the second sub-unit has positive refracting power both arranged in the order named from an object side across an air distance on an optical axis which is the longest in the first lens group, the first sub-unit includes two lenses one of which is a negative lens which is closer to an object, and wherein the second lens group includes two lenses.

2. A zoom lens comprising:

(a) a first lens group having positive refracting power; and (b) a second lens group provided on an image side of the first lens group, having negative refracting power, wherein the zooms lens has a variable power ratio of not less than 2.5 and a field angle of not less than 70° at a wide angle end, and a magnification of the zoom lens is changed by changing a distance between the first lens group and the second lens group, wherein the following conditions are satisfied, $$1.25 \leq Tw/Tt \leq 1.8$$

$$0.6 \leq fFc/fw \leq 0.9$$

where Tw represents a telephoto ratio at a wide angle end of the zoom lens, Tt represents a telephoto ratio at a telephoto end of the zoom lens, fw represents a focal length of the zoom lens at the wide angle end, and fFc represents a focal length of the first lens group, and wherein the first lens group has a first sub-unit and a second sub-unit, said second sub-unit includes one negative lens and one positive lens, or includes one negative lens and two positive lenses, wherein the first sub-unit has positive refracting power and the second sub-unit has positive refracting power both arranged in the order named from an object side across an air distance on an optical axis which is the longest in the first lens group, the first sub-unit includes two lenses, and wherein the second lens group includes two lenses.

3. The zoom lens of claim 1, wherein the second lens group consists of two lenses.

4. A zoom lens comprising:

(a) a first lens group having positive refracting power; and (b) a second lens group provided on an image side of the first lens group, having negative refracting power, wherein the zooms lens has a variable power ratio of not less than 2.5 and a field angle of not less than 70° at a wide angle end, and a magnification of the zoom lens is changed by changing a distance between the first lens group and the second lens group, wherein the following conditions are satisfied, $$1.25 \leq Tw/Tt \leq 1.8$$

$$0.6 \leq fFc/fw \leq 0.9$$

where Tw represents a telephoto ratio at a wide angle end of the zoom lens, Tt represents a telephoto ratio at a telephoto end of the zoom lens, fw represents a focal length of the zoom lens at the wide angle end, and fFc represents a focal length of the first lens group, and wherein the first lens group has a first sub-unit and a second sub-unit, said second sub-unit includes one negative lens and one positive lens, or includes one negative lens and two positive lenses, wherein a lens of the first lens group provided closest to an object is an aspherical lens, and wherein the second lens group includes two lenses.

5. A zoom lens comprising:

(a) a first lens group having positive refracting power; and (b) a second lens group provided on an image side of the first lens group, having negative refracting power, wherein the zooms lens has a variable power ratio of not less than 2.5 and a field angle of not less than 70° at a wide angle end, and a magnification of the zoom lens is changed by changing a distance between the first lens group and the second lens group, wherein the following conditions are satisfied, $$1.25 \leq Tw/Tt \leq 1.8$$

$$0.6 \leq fFc/fw \leq 0.9$$

where Tw represents a telephoto ratio at a wide angle end of the zoom lens, Tt represents a telephoto ratio at a telephoto end of the zoom lens, fw represents a focal length of the zoom lens at the wide angle end, and fFc represents a focal length of the first lens group, and wherein the first lens group has a first sub-unit having positive refracting power and a second sub-unit, said second sub-unit includes one negative lens and one positive lens, or includes one negative lens and two positive lenses, and having positive refracting power both arranged in the order named from an object side across an air distance on an optical axis which is the longest in the first lens group, the first sub-unit having an aspherical plastic lens, and wherein the second lens group includes two lenses.

6. A camera having a zoom lens comprising:

(a) a first lens group having positive refracting power; and (b) a second lens group provided on an image side of the first lens group, having negative refracting power, wherein the zooms lens has a variable power ratio of not less than 2.5 and a field angle of not less than 70° at a wide angle end, and a magnification is changed by changing a distance between the first lens group and the second lens group, wherein the following conditions are satisfied, $$1.25 \leq Tw/Tt \leq 1.8$$

$$0.6 \leq fFc/fw \leq 0.9$$

where Tw represents a telephoto ratio at a wide angle end of the zoom lens, Tt represents a telephoto ratio at a telephoto end of the zoom lens, fw represents a focal length of the zoom lens at the wide angle end, and fFc represents a focal length of the first lens group, and wherein the first lens group has a first sub-unit and a second sub-unit, said second sub-unit includes one negative lens and one positive lens, or includes one negative lens and two positive lenses, wherein the first sub-unit has negative refracting power and the second sub-unit has positive refracting power both arranged in the order named from an object side across an air distance on an optical axis which is the longest in the first lens group, the first sub-unit includes two lenses one of which is a negative lens which is closer to an object, and wherein the second lens group includes two lenses.

7. A camera having a zoom lens comprising:

(a) a first lens group having positive refracting power; and (b) a second lens group provided on an image side of the first lens group, having negative refracting power, wherein the zooms lens has a variable power ratio of not less than 2.5 and a field angle of not less than 70° at a wide angle end, and a magnification is changed by changing a distance between the first lens group and the second lens group, wherein the following conditions are satisfied, $$1.25 \leq Tw/Tt \leq 1.8$$

$$0.6 \leq fFc/fw \leq 0.9$$

where Tw represents a telephoto ratio at a wide angle end of the zoom lens, Tt represents a telephoto ratio at a telephoto end of the zoom lens, fw represents a focal length of the zoom lens at the wide angle end, and fFc represents a focal length of the first lens group, and wherein the first lens group has a first sub-unit and a second sub-unit, said second sub-unit includes one negative lens and one positive lens, or includes one negative lens and two positive lenses, wherein the first sub-unit has positive refracting power and the second sub-unit has positive refracting power both arranged in the order named from an object side across an air distance on an optical axis which is the longest in the first lens group, the first sub-unit includes two lenses, and wherein the second lens group includes two lenses.

8. The zoom lens of claim 2, wherein the second lens group consists of two lenses.

9. The zoom lens of claim 4, wherein the second lens group consists of two lenses.

10. The zoom lens of claim 5, wherein the second lens group consists of two lenses.

11. A camera having a zoom lens of comprising:

(a) a first lens group having positive refracting power; and (b) a second lens group provided on an image side of the first lens group, having negative refracting power, wherein the zooms lens has a variable power ratio of not less than 2.5 and a field angle of not less than 70° at a wide angle end, and a magnification of the zoom lens is changed by changing a distance between the first lens group and the second lens group, wherein the following conditions are satisfied, $$1.25 \leq Tw/Tt \leq 1.8$$

$$0.6 \leq fFc \leq 0.9$$

where Tw represents a telephoto ratio at a wide angle end of the zoom lens, Tt represents a telephoto ratio at a telephoto end of the zoom lens, fw represents a focal length of the zoom lens at the wide angle end, and fFc represents a focal length of the first lens group, wherein the first lens group has a first subunit and a second sub-unit, said second sub-unit includes one negative lens and one positive lens, or includes one negative lens and two positive lenses, wherein a lens of the first lens group provided closest to an object is an aspherical lens, and wherein the second lens group includes two lenses.

12. A camera having a zoom lens comprising:

(a) a first lens group having positive refracting power; and (b) a second lens group provided on an image side of the first lens group, having negative refracting power, wherein the zooms lens has a variable power ratio of not less than 2.5 and a field angle of not less than 70° at a wide angle end, and a magnification of the zoom lens is changed by changing a distance between the first lens group and the second lens group, wherein the following conditions are satisfied, $$1.25 \leq Tw/Tt \leq 1.8$$

$$0.6 \leq fFc/fw \leq 0.9$$

where Tw represents a telephoto ratio at a wide angle end of the zoom lens, Tt represents a telephoto ratio at a telephoto end of the zoom lens, fw represents a focal length of the zoom lens at the wide angle end, and fFc represents a focal length of the first lens group, and wherein the first lens group has a first sub-unit having positive refracting power and a second sub-unit, said second sub-unit includes one negative lens and one positive lens, or includes one negative lens and two positive lenses, and having positive refracting power both arranged in the order named from an object side across an air distance on an optical axis which is the longest in the first lens group, the first sub-unit having an aspherical plastic lens, and wherein the second lens group includes two lenses.

* * * * *